United States Patent [19]

Racciato

[11] 4,105,461
[45] Aug. 8, 1978

[54] THICKENING COMPOSITIONS CONTAINING XANTHAN GUM, GUAR GUM AND STARCH

[75] Inventor: Joseph S. Racciato, San Diego, Calif.

[73] Assignee: Merck & Co., Inc., Rahway, N.J.

[21] Appl. No.: 717,844

[22] Filed: Aug. 26, 1976

[51] Int. Cl.$^2$ ............................ C08L 3/00; C08L 5/00
[52] U.S. Cl. .................................... 106/205; 106/213; 252/8.5 C
[58] Field of Search ............................ 106/205, 208; 252/8.5 C

[56] References Cited

U.S. PATENT DOCUMENTS

| | | | |
|---|---|---|---|
| 3,137,592 | 6/1964 | Protzman et al. | 106/210 |
| 3,243,000 | 3/1966 | Patton et al. | 252/8.5 C |
| 3,765,918 | 10/1973 | Jordan | 106/208 |

Primary Examiner—Theodore Morris
Attorney, Agent, or Firm—Donald J. Perrella

[57] ABSTRACT

A blend of xanthan gum, guar gum, or guar gum derivatives, a starch ether has unique thickening properties. The blend is particularly useful in printing pastes, salad dressings and oil well drilling muds.

9 Claims, No Drawings

THICKENING COMPOSITIONS CONTAINING XANTHAN GUM, GUAR GUM AND STARCH

RELATIONSHIP OF THE PRIOR ART

Xanthan gum, which is a biosynthetic gum produced by fermentation of bacteria of the genus Xanthomonas, has wide applications as a thickener or a thickener blend component. U.S. Pat. No. 3,765,918, describes a blend of heat treated xanthan gum with guar gum which demonstrates synergistic activity, the aqueous sols of blends of xanthan gum, as pretreated according to that patent, with guar gum, produce viscosities in excess of their additive viscosities.

SUMMARY OF THE INVENTION

It has now been found that blends of xanthan gum, guar gum, and starch produce aqueous sols with synergistic behavior: their viscosity exceeds that of the individual components, or of the blend of heat-treated xanthan gum and guar gum taught in the prior art. The unexpected increase in viscosity is found in blends of the three components containing 5–90% xanthan gum, 5–90% starch and 5–90% guar, the total amounts of the three components being chosen to total 100% (weight basis).

This blend of gum is prepared by wet incorporation of the desired weights of the three components, followed by extrusion, drying, and milling to form a homogenous blend.

DETAILED DESCRIPTION

Xanthan gum is a fermentation product prepared by action of the bacteria of the genus Xanthomonas upon carbohydrates. Four species of Xanthomonas, *X. Campestris, X. phaseoli, X. malvocearum,* and *X. carotal* are reported in the literature to be the most efficient gum producers. Although the exact chemical structure is not determined, it is generally accepted to be a heteropolysaccharide with a molecular weight of several million. It contains D-glucose, D-mannose, and D-glucuronic acid in the molar ratio of 2.8:3:2.0. The molecule contains 4.7% acetyl and about 3% pyruvate. The proposed chemical structure configuration can be found in McNeely and Kang, Industrial Gums, ed. R. L. Whistler, Ch XXI, 2nd Edition, New York, 1973. The procedure for growing, isolating and purifying the xanthan gum is also found in that publication.

Guar gum is classed chemically as a galactomannan gum, and is derived from the seed of the guar plant, *Cyanaposis tetragonolobus.* The commercial gum is substantially pure endosperm from that seed. It is particularly useful in the practice of this invention as the pure gum; however, derivatives such as oxidized guar gum, carboxymethylated guar gum, hydroxyalkylated guar gums, are also useful. The hydroxyalkyl guar gum derivatives include hydroxyether and hydroxypropylguar.

The starch which is used in this invention is a starch ether, a derivative prepared from starch in its native, ungelatinized granule form. For instance, hydroxyalkyl ether derivatives are prepared by reacting starch with ethylene oxide or propylene oxide to yield the hydroxyethyl or hydroxypropyl derivative, respectively. High or low substituted starches can be prepared using modifications of this basic process. In addition, sodium carboxymethyl starch is also known, as are oxidized derivatives of sodium carboxymethyl starch prepared using oxidants such as sodium hypochlorite. Other cationic ethers of ungelatinized starch are known, containing tertiary amino or quaternary ammonium alkyl groups, such as diethylamino methyl, or quaternary ammonium alkyl groups, such as (hydroxypropyl)trimethylammonium chloride, or (2,3-butenyl) trimethyl ammonium chloride. The preferred starch derivative which is useful in this invention is carboxymethyl starch having low substitution.

To make the desired gum blend, the chosen amount of each gum is admixed in a wet process. The xanthan is employed as precipitated gum fiber, and the guar and starch ether are mixed with from about 40% to about 75% water, preferably from about 50% to about 70% water. Other salts and chemicals (pH adjusters, biocide, defoamers, etc.) can be optionally added. The blend is then mixed thoroughly, extruded, dried, and milled to the desired mesh size.

As stated, from about 5% to about 90% xanthan gum, from about 5% to about 90% guar gum, and from about 5% to about 90% starch ether can be used, to a total of 100%, to form the desired blend. Within these broad ranges, particularly preferred ranges have been found as set forth in the following table:

|  | % By Weight | | |
| --- | --- | --- | --- |
|  | Xanthan Gum | Starch Ether | Guar Gum |
| No. 1 | 30–60 | 20–35 | 20–35 |
| No. 2 | 20–40 | 35–55 | 25–45 |
| No. 3 | 50–70 | 15–25 | 15–25 |

The following specific combinations form sols with rheological properties particularly adapted to applications in textile printing and oil well drilling muds.

|  | Xanthan Gum | Starch Ether | Guar Gum |
| --- | --- | --- | --- |
| No. 4 | 55 | 22.5 | 22.5 |
| No. 5 | 40 | 35 | 25 |
| No. 6 | 60 | 17.5 | 22.5 |

The drying step to prepare the blend is accomplished by heating the wet blend until the moisture content of the final blend is from about 80% to about 95%. The heating step can be carried out by convection heating, conduction heating, radiant heating, or irradiation heating. The time is dependent upon the exact method and equipment used.

The blends described are particularly useful as printing paste thickeners for wet-on-wet printing of textiles, thickeners for salad dressings, and thickeners for oil well drilling muds.

The following examples illustrate the present invention without, however, limiting the same thereto.

EXAMPLE 1

Two blends are prepared each containing 50% by weight xanthan gum, 25% by weight guar gum and 25% by weight carboxymethyl starch. Blend 1 contains potato starch (Solvitose C5) and blend 2 contains corn starch (Kogum HS). The components are dry mixed thoroughly and mixed with sufficient water to form a paste. The paste is then extruded, dried and milled to particle size <30 mesh and >80 mesh (U.S. standard screen) to form the final blend. The viscosity of a 1% solution of each blend is determined on a Brookfield viscometer, Model LVF, spindle 3, at 30 rpm and compared with that of a similarly determined 1% solution of xanthan gum. The results are as follows:

|  | Reading | Viscosity |
|---|---|---|
| Blend 1 | 40 | 1600 |
| Blend 2 | 45 | 1800 |
| Xanthan gum | 40 | 1600 |

EXAMPLE 2

To a mixture containing 40 parts by weight xanthan gum, 30 parts by weight guar gum and 30 parts by weight corn starch there is added 0.1 part by weight of Dowicide 100 and 0.5 parts by weight of Defoamer 267A. A blend is then prepared as described in Example 1. Viscosities of 1% solutions are tested as described in Example 1 and compared with a 1% solution of xanthan gum.

|  | BLEND | | XANTHAN GUM | |
|---|---|---|---|---|
| RPM | READING | VISCOSITY | READING | VISCOSITY |
| 6 | 47.0 | 9400 | 34.5 | 6900 |
| 12 | 51.0 | 5100 | 37.25 | 3725 |
| 30 | 58.5 | 2340 | 42.0 | 1680 |
| 60 | 66.0 | 1320 | 46.5 | 930 |
| 30 | 58.0 | 2320 | 42.0 | 1680 |
| 12 | 50.0 | 5000 | 36.0 | 3600 |
| 6 | 45.0 | 9000 | 32.0 | 6400 |

At all shear rates, the blend has higher viscosity than the xanthan gum. The viscosity readings are substantially unchanged after 48 hours.

EXAMPLE 3

Aliquots of blend 2 from Example 1 are used as stabilizers for paraffin emulsions and compared to carboxymethyl cellulose (CMC). The formulations have the following composition:

|  | 1 | 2 | 3 |
|---|---|---|---|
| Paraffin | 25% | 25% | 25% |
| Tergitol | 1% | 1% | 1% |
| Stabilizer | 0.5% (CMC) | 0.5% (Blend 2) | 0.25% (Blend 2) |
| Water | 73.5% | 73.5% | 73.75% |

Each emulsion is prepared as follows:
1. Mix paraffin and Tergitol and heat to 90° C.
2. Mix stabilizer and water and heat to 90° C.
3. Combine heated mixtures 1 and 2 with agitation to form emulsion.
4. Pour hot emulsion into graduated cylinders and allow to cool.

The results on cooling show that the formulations made with the blend 2 stabilizers give more stable emulsions with less separation even when used at a concentration half that of the CMC.

EXAMPLE 4

A blend containing 55% by weight xanthan gum, 22.5% by weight guar gum and 22.5% by weight starch is prepared as described in claim 1 and then used as thickener in the following French dressing:

| Ingredients | % by Weight |
|---|---|
| Thickener | 0.25 |
| Mustard, powdered | 1.25 |
| Paprika, powdered | 1.25 |
| Salt | 4.00 |
| Vinegar (100 grain) | 9.00 |
| Sugar | 11.50 |
| Water | 34.65 |
| Vegetable oil | 38.00 |

Procedure:
1. Hydrate thickener blend with ½the sugar in all of the water and vinegar under vigorous agitation for 15 minutes.
2. Blend all remaining solids and add to 1.
3. Add oil slowly.
4. Pass through a colloid mill at 0.005 cm.

The resulting dressing has satisfactory viscosity and stability.

EXAMPLE 5

A thickener containing 40 weight % xanthan gum, 25% guar gum and 35% starch is prepared according to the procedure of Example 1 and is used as a thickener in a printing paste having the following formulation:

| Thickener | 0.75 |
|---|---|
| Acid Blue 25 | 0.21 |
| Acid Yellow 151 | 0.30 |
| Acid Red 266 | 0.65 |
| Citric Acid | 3.0 |
| Water | 95.09 |

This paste is printed on nylon and fixed at atmospheric conditions using steam at 210°–215° F. Satisfactory results are obtained.

EXAMPLE 6

A thickener containing in parts by weight 60% xanthan gum, 22.5% guar gum and 17.5% starch is used as a drilling fluid for an oil field well. The drilling fluid has the following formulation:

|  | Kg. |
|---|---|
| Thickener blend | 0.45 |
| Water | 2.27 |
| KCl | 4.76 |

EXAMPLE 7

A blend of 90% xanthan gum, 5% guar gum and 5% starch is prepared according to the method of claim 1 and incorporated into the following formulation:

| Ingredient | Weight % |
|---|---|
| Blend | 0.8 |
| Oxalic acid | 2.0 |
| Benzyl alcohol | 2.0 |
| Nonionic wetting agent (low foaming) | 0.25 |
| Acid Blue 25 | 0.25 |
| Acid Violet 48 | 0.15 |
| Water | 94.55 |
|  | 100.00 |

The formulation is printed on 100% nylon carpet and fixed at 100°–105° C. using atmospheric steam. Good results are obtained as the rheological properties of the blends are more suitable for printing than any of the gums individually.

EXAMPLE 8

A blend of 5% xanthan gum, 90% guar gum and 5% starch is prepared according to the method of example 1, and incorporated into the following formulation:

| Ingredient | Weight % |
| --- | --- |
| Blend | 0.6 |
| Formic acid | 2.5 |
| Thiodiethylene glycol | 1.75 |
| Nonionic wetting agent | 0.15 |
| Antifoam (non-silicone type) | 0.10 |
| Acid yellow 19 | 0.75 |
| Acid red 145 | 0.45 |
| Acid blue 40 | 0.04 |
| Water | 93.66 |
|  | 100.00 |

This formulation is used for space printing 100% nylon second color on knit-de-knit and fixed at 100°–105° C. for 8 minutes using atmospheric steam. Good results are obtained as the rheological properties of the blends are more suitable for printing than any of the gums individually.

EXAMPLE 9

A pudding base mix is prepared having the following formulations:

| Ingredient | Weight % |
| --- | --- |
| Fine sugar | 82.9 |
| Dextrose, food grade | 10.98 |
| Tetrasodiumpyrophosphate | 2.97 |
| Salt | 1.4 |
| $Na_2HPO_4$ | 1.5 |
| Vanilla flavor | 0.25 |
|  | 100.00 |

Three formulations are then prepared by mixing 80 g of the base mix with
  A. 20 parts starch (food grade), or
  B. 20 parts of a blend containing 90% starch (food grade), 5% xanthan gum and 5% guar gum, or
  C. 10 parts of blend B.

The same food grade starch was used in blends A, B and C. Puddings are prepared by adding 100 g of formulations A and B and 90 g of formulation C, respectively, to 1 pint (0.473 liter) of cold milk and agitating for 1–1.5 minutes with an electric mixer at low speed. The formulations are then poured into cups and refrigerated.

Compared to A, a commercial formulation, B had satisfactory taste and slightly heavier mouth feel, while C has both better taste and mouth feel although less than half the starch content of A.

What is claimed is:

1. A thickening composition consisting essentially of from about 5 to about 90 weight % of xanthan gum, from about 5 to about 90 weight % of guar gum, and from about 5 to about 90 weight % of starch ether, the xanthan gum being unmodified by a polyvalent cation and being unmodified by heating in a dry state before blending with the guar gum, the composition exhibiting a synergistic increase in viscosity compared to the additive viscosities of the individual components.

2. A composition according to claim 1 containing from about 20 to about 70 weight % of xanthan gum, from about 15 to about 45 weight % of guar gum, and from about 15 to about 55 weight % of starch ether.

3. A composition according to claim 2 containing from about 40 to about 60 weight % xanthan gum, from about 22.5 to about 25 weight % guar gum, and from about 17.5 to about 25 weight % starch ether.

4. A composition according to claim 2 containing from about 30 to about 60 weight % of xanthan gum, from about 20 to about 35 weight % of guar gum, and from about 20 to about 35 weight % of starch ether.

5. A composition according to claim 2 containing from about 20 to about 40 weight % of xanthan gum, from about 25 to about 45 weight % of guar gum, and from about 35 to about 55 weight % of starch ether.

6. A composition according to claim 2 containing from about 50 to about 70 weight % of xanthan gum, from about 15 to about 25 weight % of guar gum, and from about 15 to about 25 weight % of starch ether.

7. A composition according to claim 2 containing about 50 weight xanthan gum, about 25 weight % guar gum, and about 25 weight % starch ether.

8. A composition according to claim 2 containing about 40 weight % xanthan gum, about 30 weight % guar gum and about 30 weight % starch ether.

9. A composition according to claim 2 contaiing about 50 weight % xanthan gum, about 22.5 weight % guar gum, and about 22.5 weight % starch ether.

* * * * *